United States Patent
Noordergraaf et al.

(10) Patent No.: US 7,765,541 B1
(45) Date of Patent: Jul. 27, 2010

(54) MINIMIZATION METHODOLOGY

(75) Inventors: Alexander A. Noordergraaf, Meredith, NH (US); Nicholas O'Donnell, Dracut, MA (US)

(73) Assignee: Oracle America, Inc., Redwood City, CA (US)

( * ) Notice: Subject to any disclaimer, the term of this patent is extended or adjusted under 35 U.S.C. 154(b) by 1515 days.

(21) Appl. No.: 10/854,015

(22) Filed: May 26, 2004

(51) Int. Cl.
*G06F 9/445* (2006.01)
*G06F 9/44* (2006.01)

(52) U.S. Cl. ............... 717/175; 717/124; 717/170

(58) Field of Classification Search ............... None
See application file for complete search history.

(56) References Cited

U.S. PATENT DOCUMENTS

| | | | | |
|---|---|---|---|---|
| 5,842,024 | A * | 11/1998 | Choye et al. | 717/178 |
| 5,950,010 | A * | 9/1999 | Hesse et al. | 717/178 |
| 5,960,204 | A * | 9/1999 | Yinger et al. | 717/176 |
| 6,381,694 | B1 * | 4/2002 | Yen | 713/2 |
| 6,738,970 | B1 * | 5/2004 | Kruger et al. | 717/175 |
| 6,938,250 | B2 | 8/2005 | Cohen et al. | |
| 6,993,642 | B2 | 1/2006 | Burkhardt et al. | |
| 7,051,093 | B1 | 5/2006 | Lewis et al. | |
| 7,155,713 | B1 * | 12/2006 | Burkhardt et al. | 717/175 |
| 2003/0023839 | A1 * | 1/2003 | Burkhardt et al. | 713/1 |
| 2004/0107179 | A1 * | 6/2004 | Dalrymple et al. | 707/1 |
| 2004/0210796 | A1 * | 10/2004 | Largman et al. | 714/20 |
| 2005/0049790 | A1 * | 3/2005 | Holman et al. | 702/3 |
| 2005/0229039 | A1 * | 10/2005 | Anderson et al. | 714/23 |

OTHER PUBLICATIONS

Lance Spitzner "Armoring Solaris" Oct. 16, 2002 pp. 1-5 [online] [retrieved on Jun. 20, 2008]. Retrieved from <www.windowsecurity.com/whitepapers/Armoring_Solaris.html>.*
David Glosser "Solaris Security: An introduction to Packages, Clusters, Software Groups" 2002 pp. 1-4 [online] [retrieved on Jun. 20, 2008]. Retrieved from <www.mgmg-interactive.com/packages1.html>.*
"Core Installation of Solaris 2.7 for Check Point". pp. 1-4 [online] Sun Microsystems [retrieved on Jun. 20, 2008]. Retrieved from <solaris-x86.org/security/armoring/core7.txt>.*
Mulder; "Building Your Own (Minimal) Operating System", OS News, Jan. 31, 2003; http://www.osnews.com/story.php?news_id=2691; 2 pages.

(Continued)

*Primary Examiner*—Tuan Q Dam
*Assistant Examiner*—Evral Bodden
(74) *Attorney, Agent, or Firm*—Robert C Kowert; Meyertons, Hood, Kivlin, Kowert & Goetzel, P.C.

(57) ABSTRACT

A method and system for developing a minimized install profile for installing a minimized operating environment. After installing an operating environment comprising a plurality of installation packages on a computer system, one or more applications are also installed. System changes are determined and used to identify components added by the installed applications. Additionally, installation packages are identified that are required by the installed applications and that correspond to elements of the operating environment referenced by the added components. A minimized installation profile is created for installing a minimized operating environment based upon a minimum profile template and including the identified installation packages.

27 Claims, 11 Drawing Sheets

OTHER PUBLICATIONS

Hohndel; "Automated Installation of Linux Systems Using YaST", 13th Large Installation System Administration Conference.(LISA), 1999; http://www.usenix.org/events/lisa99/full_papers/hohndel/hohndel_html; 8pgs.

Noordergraaf; "Solaris Operating Environment Minimization for Sercurity: A Simple , Reproducible and Secure Application Installation Methodology"; Sun Microsystems; Dec. 1999, pp. 1-13, Sun BluePrints Online; Palo Alto, CA, USA.

* cited by examiner

MINIMIZATION METHODOLOGY

BACKGROUND OF THE INVENTION

1. Field of the Invention

This invention relates to minimizing computer system operating environments generally, and particularly to the generation of installation profiles for installing minimal operating environments on computer systems.

2. Description of the Related Art

Some issues regarding computer system security, operation, and maintenance relate to minimizing the amount of software or operating environment components on computer systems. Having fewer software components on a computer system generally translates into fewer possible security risks to that computer system. Having fewer software components on a computer system may also translate require fewer system resources and may reduce potential interoperability problems. A minimum software installation may also be easier to maintain.

One methodology for minimizing the amount of installed software of a system, thereby reducing system vulnerabilities and complexities, is to identify and remove, or simply not install, software components related to tasks that are not necessary for the intended system use. Generally, part of the intent of minimizing a system is to prevent the re-enabling of software components by deleting them from the system. Removing unneeded software components can make it difficult, or impossible, to use the computer system for purposes beyond those for which it is intended. For example, if a computer system is not intended to provide e-mail services, removing any e-mail software from the system may reduce or eliminate the chances of exploiting any e-mail based security holes on that computer.

Another benefit from minimizing an operating environment may include reducing time and/or effort to update, upgrade, or patch, the operating environment and/or software of a computer system. Since it may not be necessary to update, upgrade, or patch, the removed software components, the total time and effort required for system update and maintenance may be reduced accordingly.

SUMMARY

A minimized install profile for installing a minimal operating environment that supports one or more applications may be created by first installing a full version of the operating environment on a computer system. Such an operating environment may include multiple installation packages. After installing the operating environment, one or more applications are also installed. These applications may install additional installation packages or may otherwise modify the installed operating environment. System changes effected by the installation of the applications are determined and used to identify components added by the installed applications. Additionally, installation packages are identified that are required by the installed applications and that correspond to elements of the operating environment referenced by the added components. Various methods may be utilized for detecting referenced elements of the operating system, including, but not limited to tracing an executing component, examining an installed image of a component, and detecting dependencies between installation packages themselves. A minimized installation profile for installing a minimized operating environment may be generated based upon a minimum profile template and including the identified installation packages. The minimized installed profile may be verified by using it to install a minimal operating environment after which the same applications are installed. Any install errors detected while installing either the minimal operating environment or the applications may be used to identify additional installation instructions that may also be installed as part of the minimal operating environment. The minimized install profile may be updated to include the newly identified installation packages when installing the minimal operating environment. Additionally, verifying the generated install profile, identifying additional installation packages, and updating the minimized install profile may be repeated until no install errors are detected while installing the minimal operating environment and the applications.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must).

Similarly, the words "include", "including", and "includes" mean including, but not limited to.

DETAILED DESCRIPTION OF EMBODIMENTS

Figure 1A:
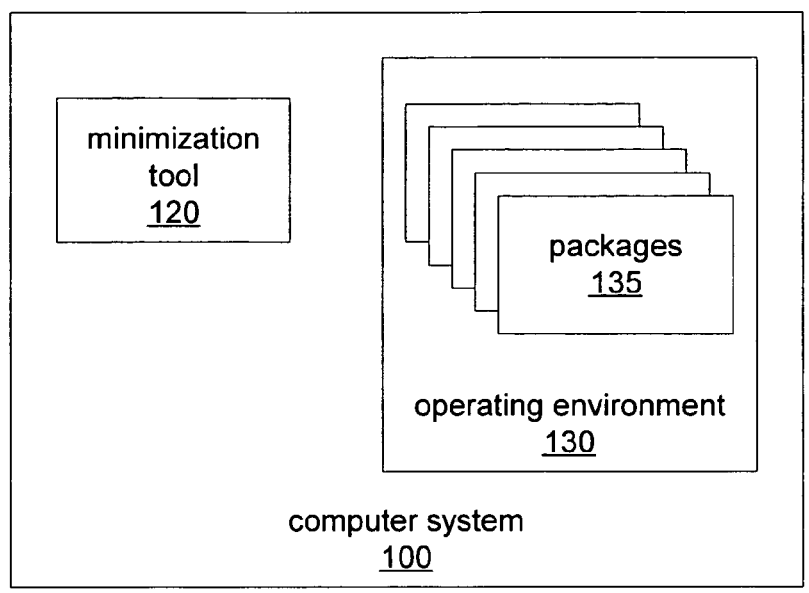
FIG. 1A is a block diagram of a computer system, according to one embodiment, suitable for implementing a minimization methodology as described herein.

FIG. 1A is a block diagram illustrating, according to one embodiment, a computer system 100 suitable for use in creating a minimized install profile as described herein. A minimization tool, such as minimization tool 120 shown in FIG. 1A, may, in one embodiment, be configured to create a minimized install profile for installing a minimal version of an operating environment, such an operating environment 130. In other embodiments, minimization tool 120 may provide a user interface for a user to create such a minimized install profile. Minimization tool 120 may, according to certain embodiments, generate a minimized install profile for installing a minimal operating environment by first installing operating environment 130 on computer system 100. Operating environment 130, in such an embodiment, may utilize a package management based system and may include one or more installation packages, such as packages 135. In other embodiments, an operating environment, such as operating environment 130, may include other software components or installation packages in additional to a base set of operating system components. When creating a minimized install profile, it is frequently important to ensure that the final install profile is able to support a certain number of software applications. For example, it may be desirous to create a minimized install profile that is able to perform certain business related functions, while not including any extraneous system or networking tools. When creating such an install profile, according to one embodiment, minimization tool 120 may first install the full version of an operating environment, such as Solaris™ from Sun Microsystems, Inc. Minimization tool 120 may then install the applications of interest that the final minimal operating environment will support.

According to some embodiments, minimization tool 120 may detect and analyze the differences in operating environment 130 in order to identify one or more components added to computer system 100 caused by installing the applications. Additionally, minimization tool 120 may, in one embodiment, identify one or more installation packages corresponding to elements of the operating environment referenced by those added components. In other words, minimization tool 120 may detect a software component added to computer system 100 when installing an application, identify an element of operating environment 130 referenced by that software component, and also identify the installation package corresponding to that referenced element.

After identifying the installation packages corresponding to the elements referenced by the components added when installing the applications, minimization tool may, according to one embodiment, generate a minimized install profile for installing a minimal version of operating environment 130. In one embodiment, minimization tool 120 may base this minimized install profile on a predefined minimum profile template that includes a basic, or core, set of installation packages required by all versions of operating environment 130. Additionally, minimization tool 120 may create the minimized install profile according to the identified installation packages to ensure that when installed, the minimal operating environment will include those installation packages required by the installed applications. Furthermore, in some embodiments, minimization tool 120 may discover that one or more of the installation packages originally installed with operating environment 130 are not required or referenced by any of components added when installing the applications, and the minimization tool may not include those installation packages when creating the minimized install profile.

Figure 1B:
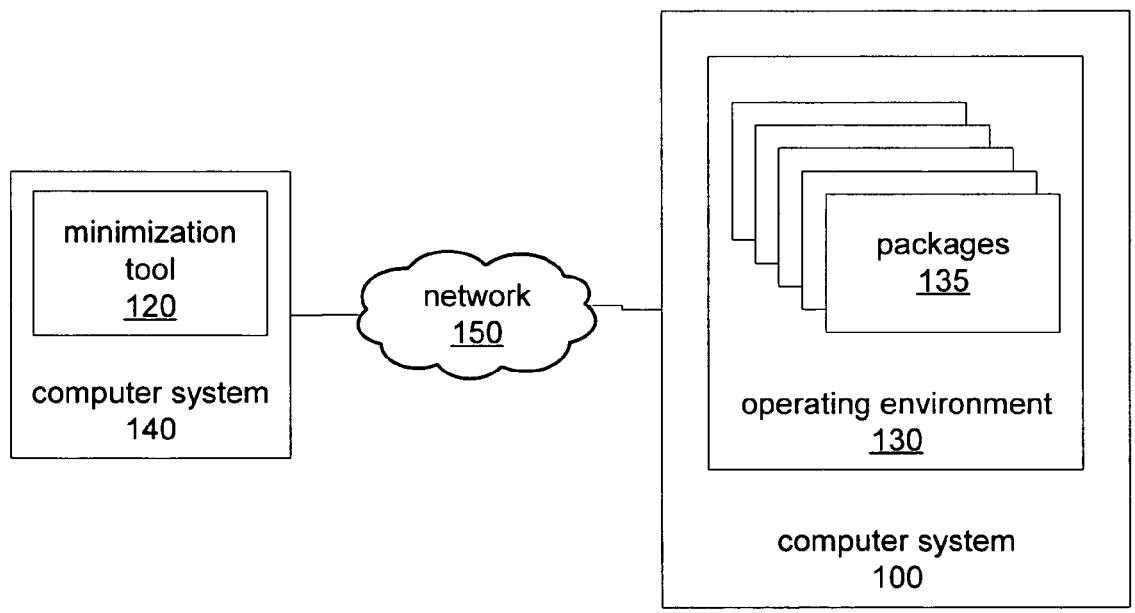
FIG. 1B is a block diagram of a network computer environment, in one embodiment, suitable for developing a minimized installation profile as described herein.

FIG. 1B is a block diagram illustrating, according to one embodiment, a networked computer environment wherein minimization tool 120 is executed on computer system 140 that can communicate with computer system 100 via network 150. Network 150 may comprise any of various network technologies according to various embodiments. Network 150 may be a local area network, wide area network, intranet network, Internet network, or many other types of network. Network 150 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 150 may be configured according to a number of different network topologies including, but not limited to, star, token-ring, token-bus, scatternet, dual-ring, mesh, etc. Network 150 may also be configured to utilize a combination of different networking technologies and/or topologies. Additionally, Network 150 may comprise shared storage or shared memory for communicating between different computer systems or between processes within the same computer system, according to some embodiments. As illustrated by FIG. 1B, minimization tool 120 may be configured, in some embodiments, to generate a minimal install profile for installing a minimal version of operating environment 130 on computer system 100 without minimization tool 120 executing on computer system 100. For example, minimization tool 120 may be capable of remotely installing operating environment 130 and various applications across network 150 and may additionally be configured to remotely examine both stored and executing components on computer system 100. In certain embodiments, minimization tool 120 may be configured to automatically detect or discover which, if any, installation packages correspond to operating environment elements that are referenced by other components. In other embodiments, minimization tool 120 may be configured to provide a user interface for a user to examine and determine such references and dependencies.

Figure 2:
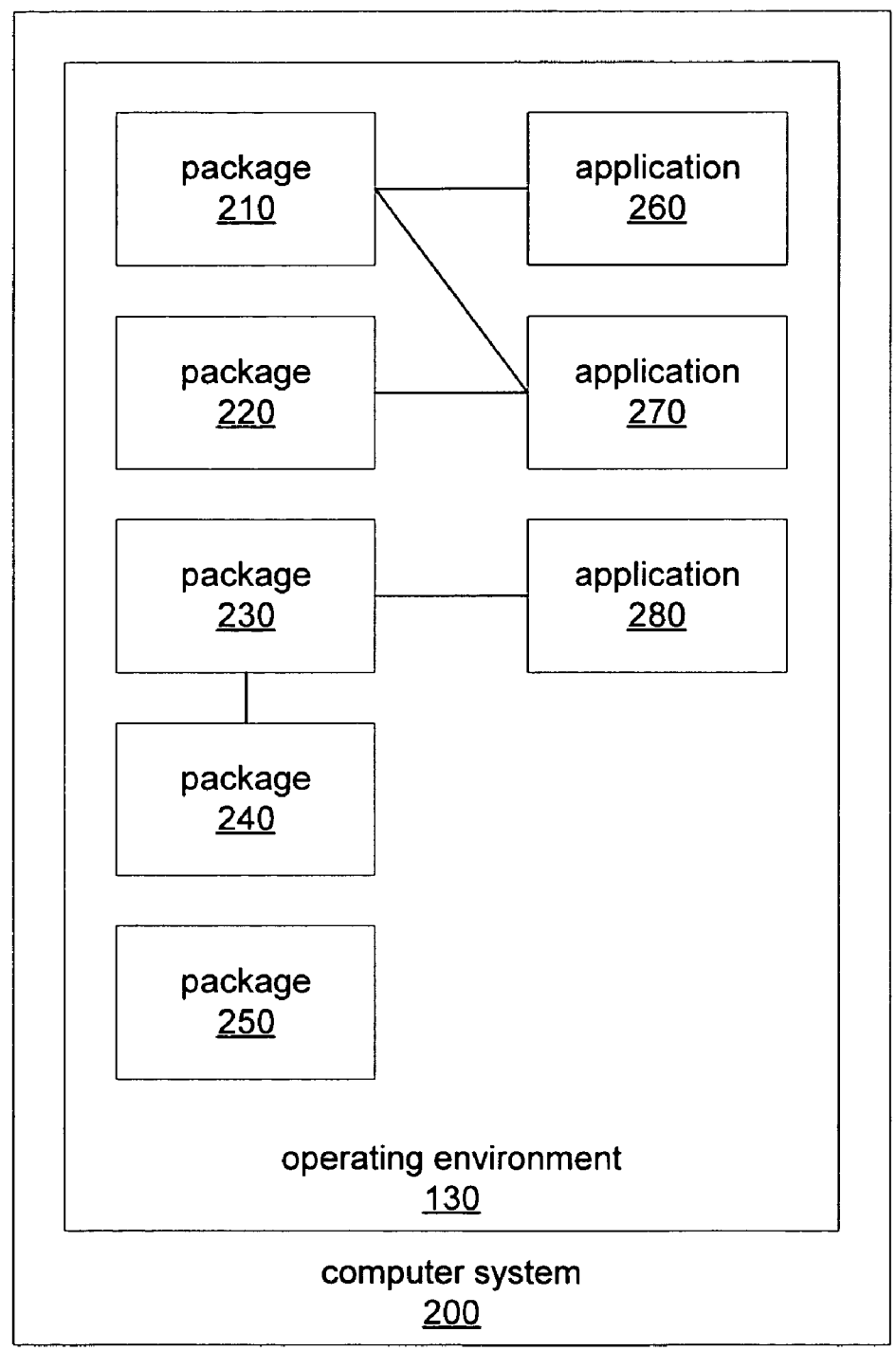
FIG. 2 is a block diagram illustrating, according to one embodiment, identifying operating environment packages referenced by installed applications.

FIG. 2 is a block diagram illustrating, according to one embodiment, a computer system 200 on which operating environment 130 and one or more applications, such as applications 160, 170 and 280, may be installed. In such an embodiment, operating environment 130 may include one or more installation packages, such as packages 210, 220, 230, 240, and 250. As described above, when creating a minimized install profile, a minimization tool, such as minimization tool 120 may install operating environment 130 onto computer system 200 and may additionally install applications 260, 270 and 280 to computer system 200. In one embodiment, minimization tool 120 may then examine operating system 130 to determine which of the installed packages are referenced by the components of applications 260, 270 and 280. As illustrated in FIG. 2, according to one embodiment, application 260 may reference package 210, application 270 may reference packages 210, and 210, while application 280 may reference package 230. Further, in some embodiments, installation packages may reference or depend upon elements from other installation packages. For example, package 230 may itself reference one additional installation package, package 240, as illustrated in FIG. 2. When creating a minimized install profile for a minimal version of operating environment 130 to support applications 260, 270 and 280, minimization tool 120 may, according to one embodiment, ensure that packages 210, 220, 230, and 240 are included, but that package 250, which isn't referenced by any installed component, is not included.

Figure 3:
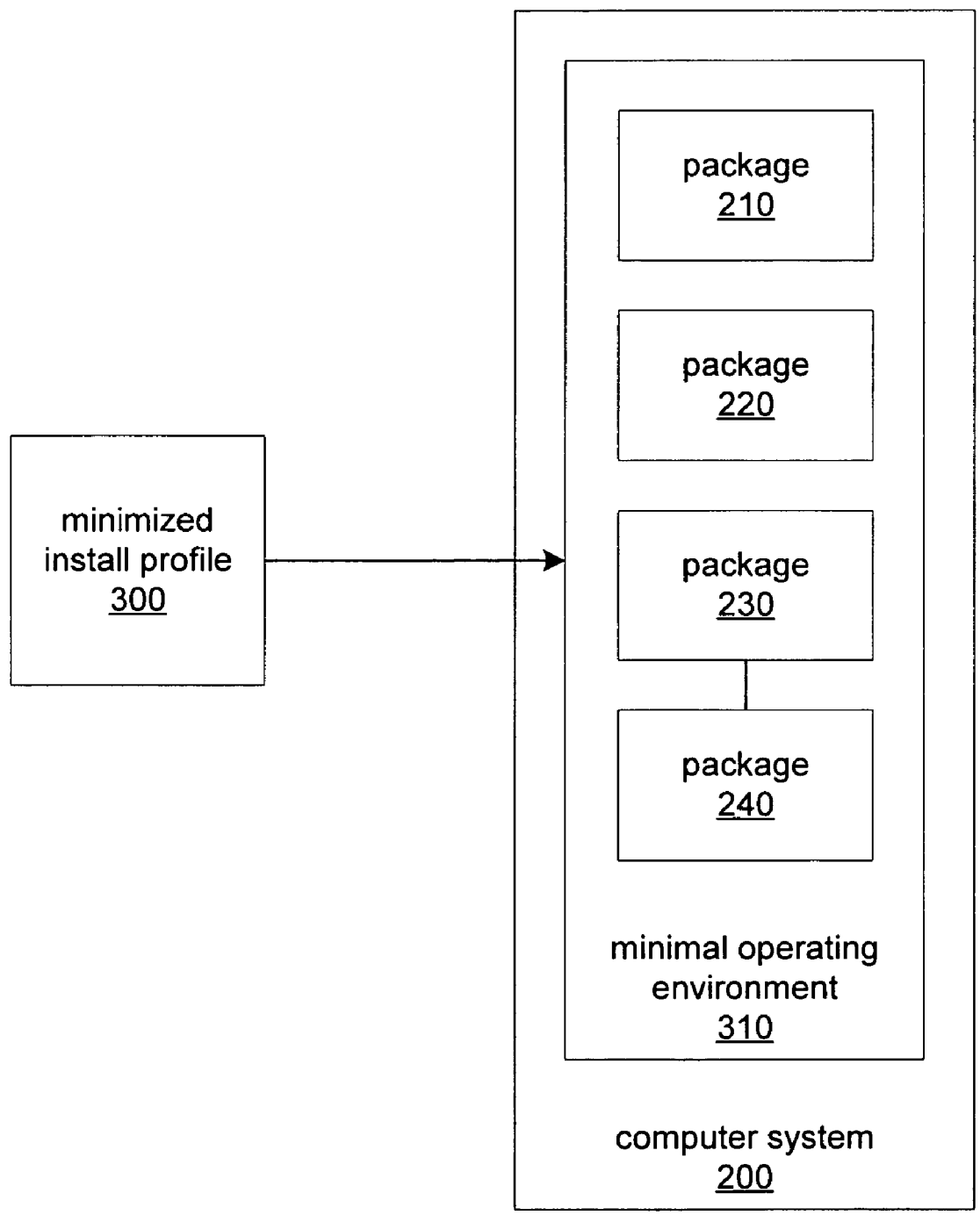
FIG. 3 is a block diagram illustrating, in one embodiment, installing a minimal operating environment according to a minimized install profile.

FIG. 3 is a block diagram illustrating, according to one embodiment, a minimized install profile 300 for installing minimal operating environment 310, including packages 210, 220, 230, 240, on computer system 200. Such a minimized install profile 300 might be the result of a minimization process performed on the computer system and operating environment described above regarding FIG. 2. Minimal operating environment 310 may, according to one embodiment, be based upon operating environment 130, described above. Following the same example used regarding FIG. 2, minimization tool 120 may, in one embodiment, create minimized install profile and use it to install minimal operating environment 310 on computer system 200. In one embodiment, minimal operating environment 310 may include all the installation packages required to properly execute applications 260, 270, and 280 described above. As a part of generating minimized install profile 300, minimization tool 120 may, in certain embodiments, check for install errors while installing minimal operating environment 310 on computer system 200. In one embodiment, errors while installing minimal operating environment 310 may indicate that one or more additional installation packages may be required in minimal operating environment 310. In some embodiments, minimization tool 120 may also check for install errors while installing applications 260, 270 and 280 (not shown in FIG. 3) and use any detected errors to identify additional installation packages that may need to be included in minimal operating environment 310. In some embodiments, minimization tool 120 may be configured to automatically install minimal operating environment 310 and the applications, and may be further configured to automatically detect any install errors. In other embodiments, however, minimization tool 120 may be configured to provide a user interface for a user to install minimal operating environment 310 and one or more application and may be further configured to provide an user interface for collected or importing user detected install errors.

Figure 4:
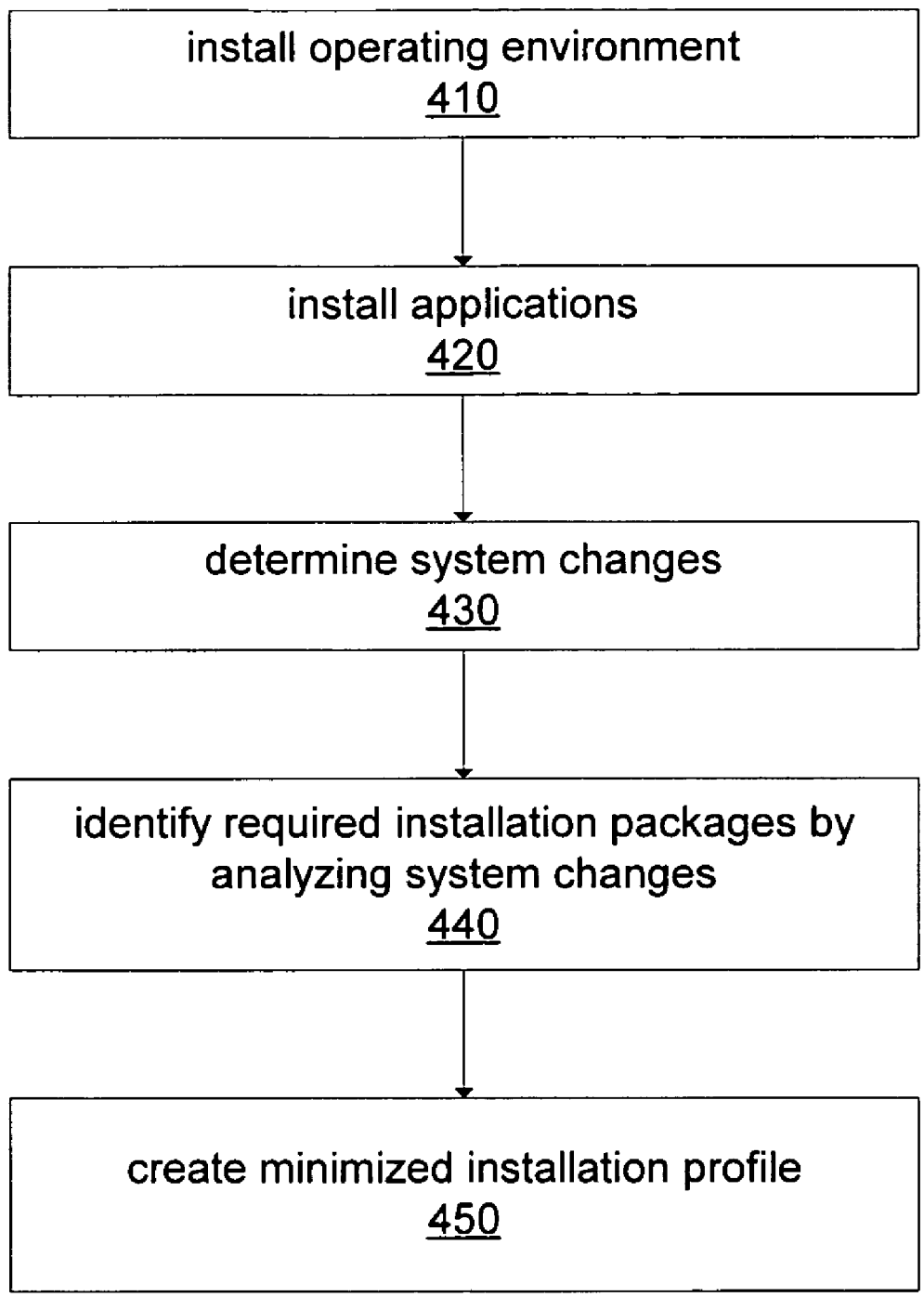
FIG. 4 is a flowchart illustrating, according to one embodiment, a method for creating a minimized install profile.

FIG. 4 is a flowchart illustrating, according to one embodiment, a method for creating a minimized installation profile for installing a minimized operating environment. As shown in block 410, an operating environment, such as operating environment 130, is installed on a computer system, such as computer system 200, as described above. In one embodiment, a minimization program, such as minimization tool 120, may install the operating environment, while in other embodiments, minimization tool 120 may provide a user interface for a user to install operating environment 120. In yet other embodiments, a user may manually install operating environment 120 without using minimization tool 120. In one embodiment a full operating environment, including all possible installation packages and options may be installed, while in another embodiment, a standard version of an operating environment may be installed. For example, in one embodiment, the installed operating environment may include only those options required to support the specific hardware of operating system 200. In another embodiment, however, the installed operating environment may include support for additional hardware or peripherals not necessarily a part of computer system 200.

According to one embodiment, minimization tool 120 may be configured to record the contents of operating environment 130 as installed. Such a snapshot may be compared to the contents of the operating environment at a later time to determine specific system changes.

After installing a normal, or full, version of operating environment 130, minimization tool 120, may as shown in block 420 and according to some embodiments, install one or more applications on computer system 200. Alternatively, in certain embodiments, a user may install the desired applications. In certain embodiments, minimization tool 120 may install some applications automatically, while providing a user interface for a user to install other applications manually. In order to determine the changes to operating environment 130 effected by installing the desired applications, minimization tool 120 may, in one embodiment, record a second snapshot of the contents of operating environment 130 after installing the applications. In another embodiment, minimization tool 120 may not actually record another snapshot of the contents of operating environment 130, but may simply compare an earlier recorded snapshot with the current state of operating environment 130 on computer system 200. By comparing the state of operating environment 130 both before and after the applications are installed, minimization tool 120 may, as shown in block 430 determine what, if any, changes were caused by installing the applications. For example, the installation program for an application may install additional system files or installation packages, or may modify the configuration of certain packages.

By analyzing the system changes determined by comparing the contents of the operating environment before and after installing the applications, a user, or minimization tool 120, may identify one or more required installation packages of the operating environment. For instance, minimization tool 120 may, through analyzing the changes effected through installing an application, determine that certain additional installation packages were installed by the application's install program, and that those installation packages may therefore be required to properly execute or use the application. For example, an email program may install additional networking or communication related packages.

According to some embodiments, minimization tool 120 may also be configured to identify one or more serviceability packages for inclusion in the minimal operating environment. Examples of such serviceability packages may include various diagnostic and proactive reporting tools for adding the reliability, accessibility and serviceability of the installed minimal operating environment. In one embodiment, minimization tool 120 may include a predefined set of serviceability packages, while in another embodiment, minimization tool 120 may be configured to determine one or more serviceability packages based upon the identified installation packages to be installed with the minimal operating environment. In other embodiments, a user may manually specify the serviceability packages to include with the minimal operating environment.

Using the identified installation packages, minimization tool 120 may create a minimized installation profile, such as minimized install profile 300, for installing a minimal version of operating environment 130. In one embodiment, minimization tool 120 may base the minimized installation profile upon a template including the basic operating environment installation packages and may add to the template by including the packages identified as being required by the installed applications or may remove packages identified as not required by the installed applications. When creating minimized installed profile 300, minimization tool 120 may additionally include packages identified in other ways, such as those described herein. Additionally, minimization tool 120 may be configured to allow a user to manually specify packages to be included in minimized install profile 300. As described above, in some embodiments, minimization tool 120 may also include one or more serviceability packages when generating minimized installation profile 300.

Minimized installation profile 300 may be configured to install only the minimized operating environment or may also be configured to install the applications or the serviceability packages in addition to the minimized operating environment, according to various embodiments. For example, in one embodiment, minimized installation profile 300 may represent one or more install scripts capable of installing the base minimal operating environment, including the identified required installation packages. In another embodiment, however, minimized installation profile 300 may also be configured to install the applications that the minimal operating environment is intended to support. In yet another embodiment, minimized installation profile 300 may be configured to install the minimal operating environment and the identified serviceability packages. According to certain embodiments, minimized installation profile 300 may be configured to install all three and may be configured to provide a user interface for a user to selectively enable which components should be installed automatically.

Figure 5:
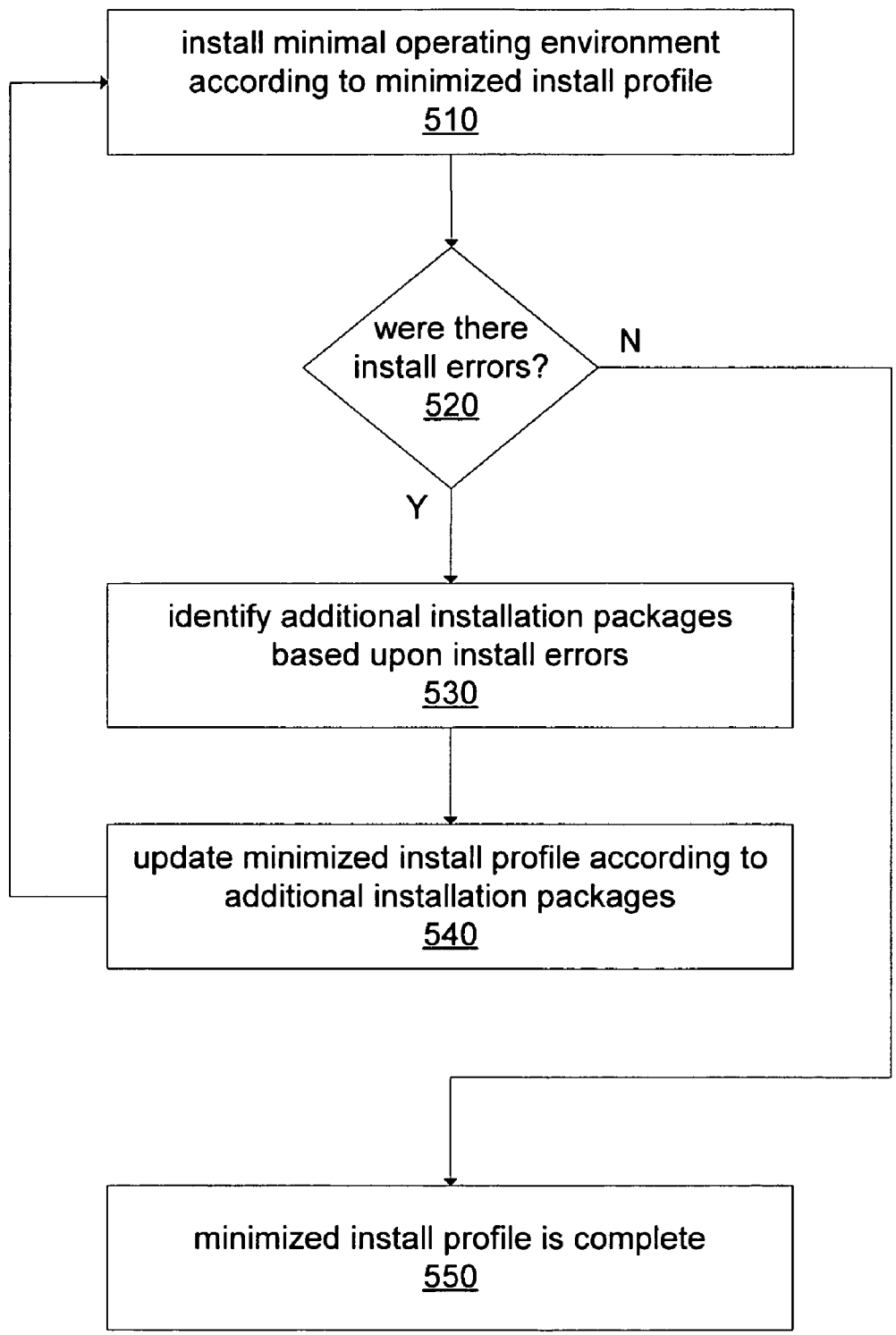
FIG. 5 is a flowchart illustrating one embodiment of a method for verifying and updating a minimized install profile.

FIG. 5 is a flowchart illustrating one embodiment of a method for verifying and updating a minimized installed profile generated as described above regarding FIG. 4. A minimization tool, such as minimization tool 120, may, in one embodiment, be configured to install a minimal operating environment, such as minimal operating environment 310, according to the minimized install profile, as shown in block 510. As described above, a minimized install profile, such as minimized install profile 300, may include a baseline set of installation packages plus additional packages identified as being required by the applications. Minimization tool 120 may be configured in one embodiment to detect and/or record any installation errors that occur while installing the minimal operating environment.

After installing minimal operating environment 130 according to minimized install profile 300, minimization tool 120 may also install the applications to be supported by the minimal operating environment. As described above, minimization tool 120 may be configured, according to various embodiments, to install just minimal operating environment 130, or to also install the applications or serviceability packages. In other words, minimization tool 120 may, in some embodiments, use minimized install profile 300 to install minimal operating environment 310 and may then install the applications that minimal operating environment 310 is intended to support. In other embodiments, however, minimized installation tool 120 may install minimal operating environment 130 and a user may manually install the applications.

Minimization tool 120 may, according to some embodiments, detect and record any installation errors that occur during installation of the operating environment or the applications, as illustrated in block 520. In certain embodiments, errors encountered while installing the minimal operating environment or while installing the applications may reflect installation packages missing from minimal operating environment 130. As shown in block 530, minimization tool 120 may, in one embodiment, be configured to identify additional installation packages based upon install errors and may update minimized install profile 300 accordingly, as shown in block 540. As illustrated by FIG. 5, minimization tool 120 may be configured to repeat the installation, error detection, and updating until no install errors are detected.

In one embodiment, minimization tool 120 may be configured to automatically install of the minimal operating environment and the applications, detecting any install errors, identify any missing or required installation packages, and update the minimized install profile until no further install errors are detected. Alternatively, in other embodiments, minimization tool 120 may provide a user interface for a user to perform some or all of these functions. Once the operating environment and the applications can be installed without producing any install errors, the minimized install profile may be considered complete, as illustrated by block 550.

Additionally, in some embodiments, once the minimized install profile has been updated such that no install errors are detected, the installed minimal operating environment and the installed applications may be tested more thoroughly to detect additional errors that may reflect missing installation packages that may be required. For instance, an automated regression test may be performed or alternatively a user may perform such testing manually.

Figure 6:
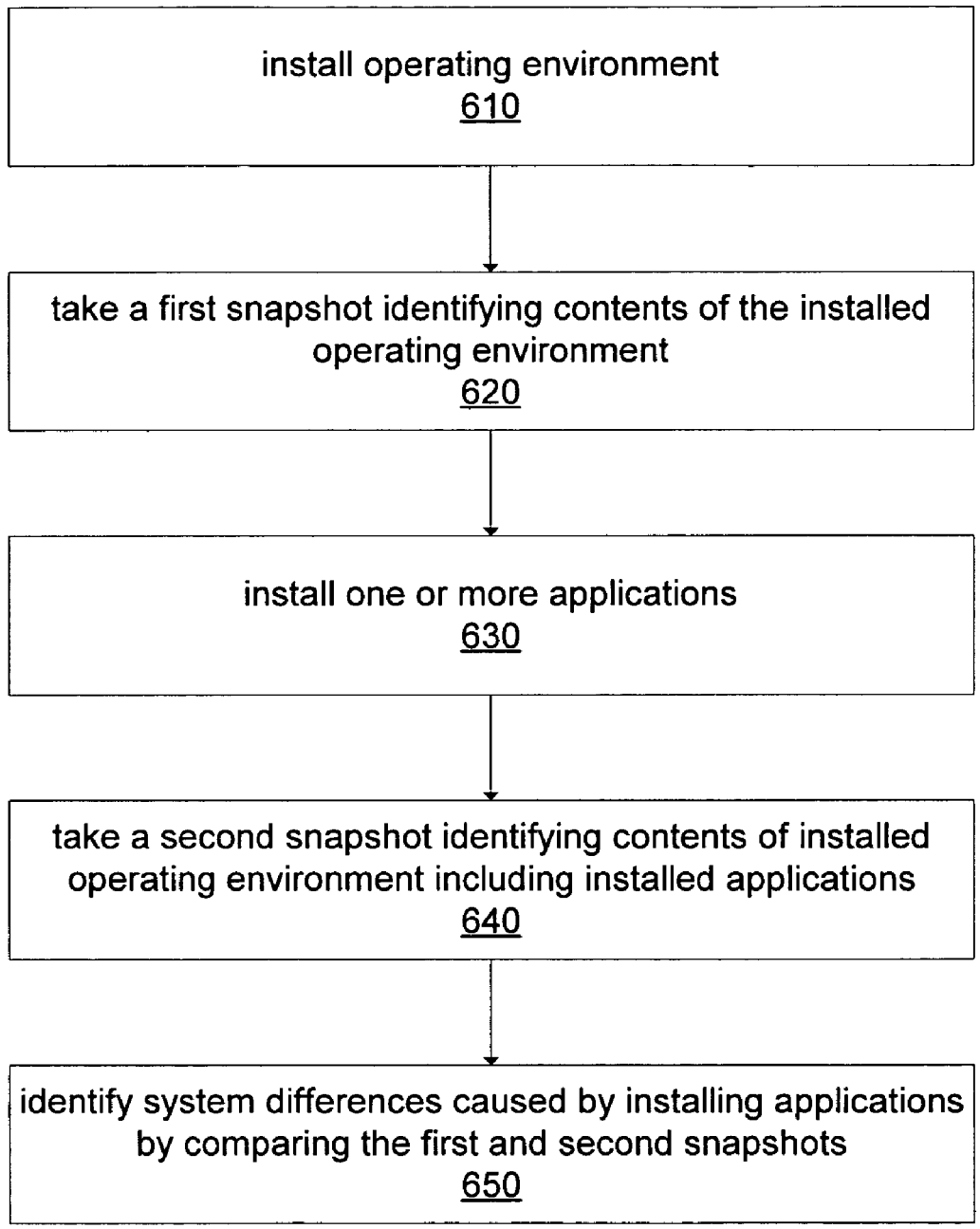
FIG. 6 is a flowchart illustrating a method, according to one embodiment, identifying the differences in an operating environment caused by the installation of software applications.

FIG. 6 is a flowchart illustrating, according to one embodiment, a method for identifying system differences caused by installing one or more applications. In some embodiments, such a method may be performed to determine system changes as illustrated by block 430 in FIG. 4. As described above and illustrated by block 610, a minimization tool, such as minimization tool 120, may install an operating environment to a computer system, such as computer system 200 and may examine and record the contents of the installed operating environment, as shown in block 620. As illustrated by block 630, minimization tool 120 may, in one embodiment, install applications to computer system 200, as described above. In some embodiments, minimization tool 120 may utilize additional install programs to install some of the applications. In yet other embodiments, a user may manually install one or more of the applications.

After installing the applications, minimization tool 120 may, in one embodiment, take a second snapshot identifying the contents of the installed operating environment, as shown in bock 640. As described above, minimization tool 120 may use any of various techniques or tools to record a snapshot of the contents of the installed operating environment. For example, in one embodiment, minimization tool 120 may use a package info software tool to identify which installation packages are installed while in another embodiment, minimization tool 120 may use a software tool such as Tripwire™ to record such a snapshot. In another embodiment however, minimization tool may examine the current contents of the installed operating environment without actually taking a snapshot or otherwise record the state of those contents. In such an embodiment, minimization tool 120 may be configured to compare the earlier state of the operating environment to the current state. Minimization tool 120 may use the differences between the two snapshots to identify the changes made to the installed operating environment by installing the applications, as shown in block 650. As described above, such changes may include additional installation packages.

Figure 7:
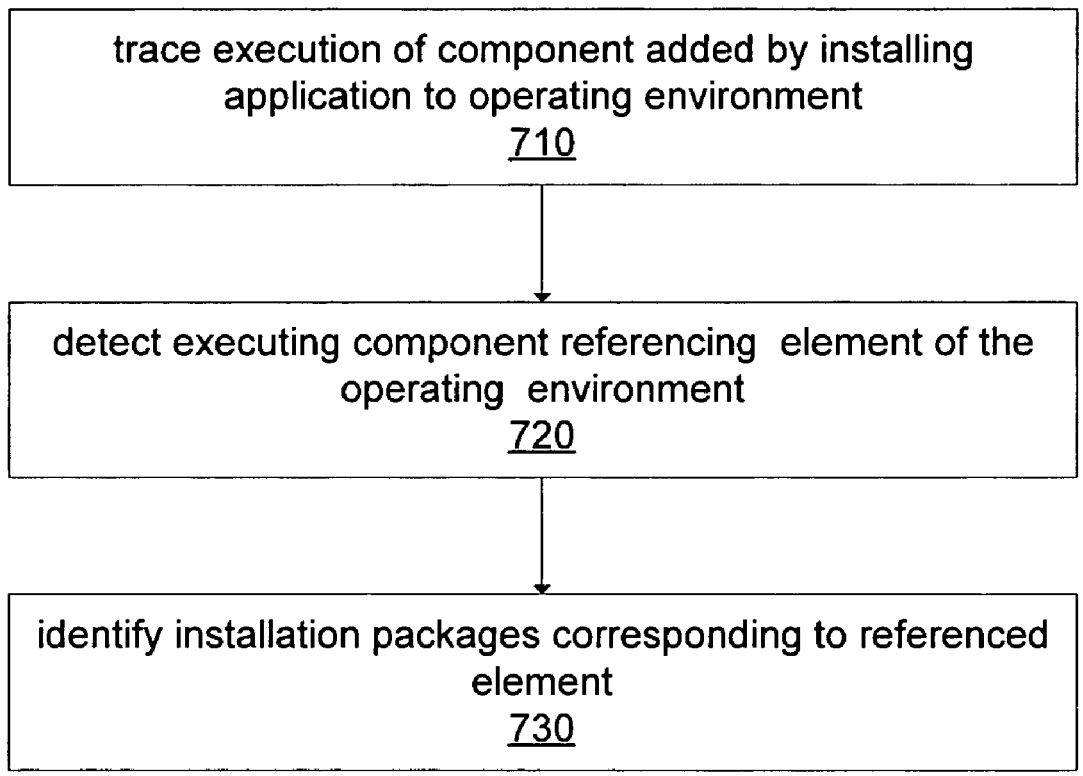
FIG. 7 is a flowchart illustrating one embodiment of a method for identifying installation packages of an operating environment by tracing execution of installed software components.

FIG. 7 is a flowchart illustrating one embodiment of a method for identifying installation packages corresponding to operating environment elements referenced by one or more installed applications. As described above, minimization tool 120 may be configured to determine operating environment changes caused by installing one or more applications and may analyze those changes to identify one or more required installation packages, as illustrated by block 440 in FIG. 4. As part of analyzing the changes and identifying required installation packages, minimization tool 120 may, in some embodiments, examine various components added while installing the applications to determine which, if any, elements of minimal operating environment 310 those components may reference. In such an embodiment, a minimization tool, such as minimization tool 120, may be configured to trace the execution of components that were added to the operating environment when applications were installed, as shown by block 710. For example, minimization tool 120 may trace an installed application itself, or a helper program installed with the application, or both. Minimization tool 120 may use various diagnostic, or debugging utilities, such as the truss (Sun Solaris) or strace (Linux) programs, to trace these components. Minimization tool 120 may, as shown in block 720, detect when the executing component references an element of the operating environment. For example, in one embodiment, truss may be used to detect that an installed application is opening a shared library of the operating environment, perhaps through one of the unix kernel functions open( ) or exec( ). After identifying such referenced elements, minimization tool 120 may, in some embodiments, identify one or more installation packages corresponding to the references elements, as shown in block 730. For example, after using to truss to detect a reference to a shared library, that library may be examined to determine the installation package corresponding to that shared library. Alternatively, according to certain embodiments, a package management system tool may be used to map a referenced operating environment element to a corresponding installation package.

In one embodiment, an executed application may be exercised, either automatically by minimization tool 120, or manually by a user, in order to maximize the number of referenced elements detected by this technique. For example, a regression test associated with the executed application may be used to ensure that all elements referenced by the application are detected. In another embodiment, an installed component or application may be executed for only a short period of time in order to detect those elements it may reference during startup or during an initialization period. In one embodiment, a user may specify how long to trace an executing program or may manually start and stop such tracing.

Figure 8:
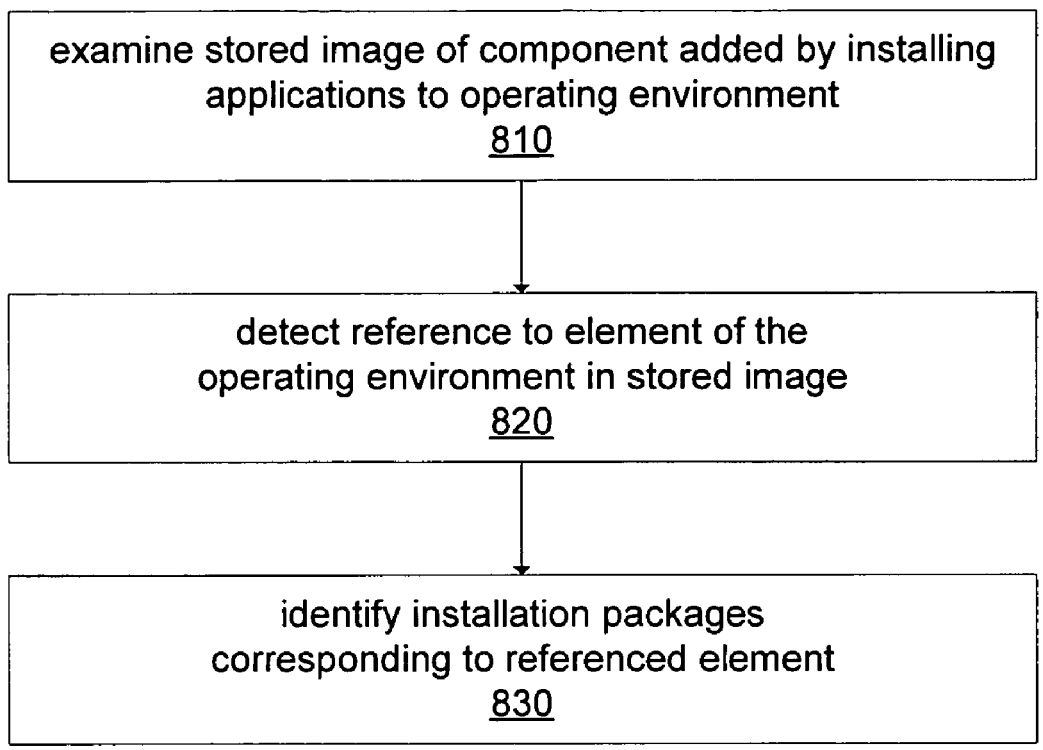
FIG. 8 is a flowchart illustrating a method, according to one embodiment, of a method for identifying referenced installation packages of an operating environment by examining stored images of installed components.

FIG. 8 is a flowchart illustrating one embodiment of a method for identifying installation packages corresponding to operating environment elements referenced by one or more installed applications. A minimization tool, such as minimization tool 120, may, according to some embodiments, use the method illustrated by FIG. 8 when analyzing system changes to identify installation packages for inclusion in a minimal operating environment, as illustrated by block 440 in FIG. 4, described above. As shown in block 810, a minimization tool, such as minimization tool 120, may examine a stored image of a component added by installing the applications. For instance, minimization tool 120 may, according to one embodiment, examine the installed disk image of an application using a program such as the Unix ldd tool. Alternatively, in another embodiment, minimization tool 120 may be configured to examine installed images directly. While examining stored images of components, minimization tool 120 may, in some embodiments, detect elements of the operating environment, other software components, or installation packages, referenced by the stored image, as shown in block 820. For example, minimization tool 120 may use ldd to identify one or more shared libraries upon which an installed application depends. In certain embodiments, minimization tool 120 may also examine the shared libraries referenced by an installed application to detect additional shared libraries that are referenced by those shared libraries. As shown in block 830, minimization tool 120 may, in one embodiment, identify one or more installation packages corresponding to the elements referenced by the installed components or applications. As described above, minimization tool 120 may, in some embodiments, utilize a package management tool to identify the installation packages that correspond to the referenced operating environment elements.

Figure 9:
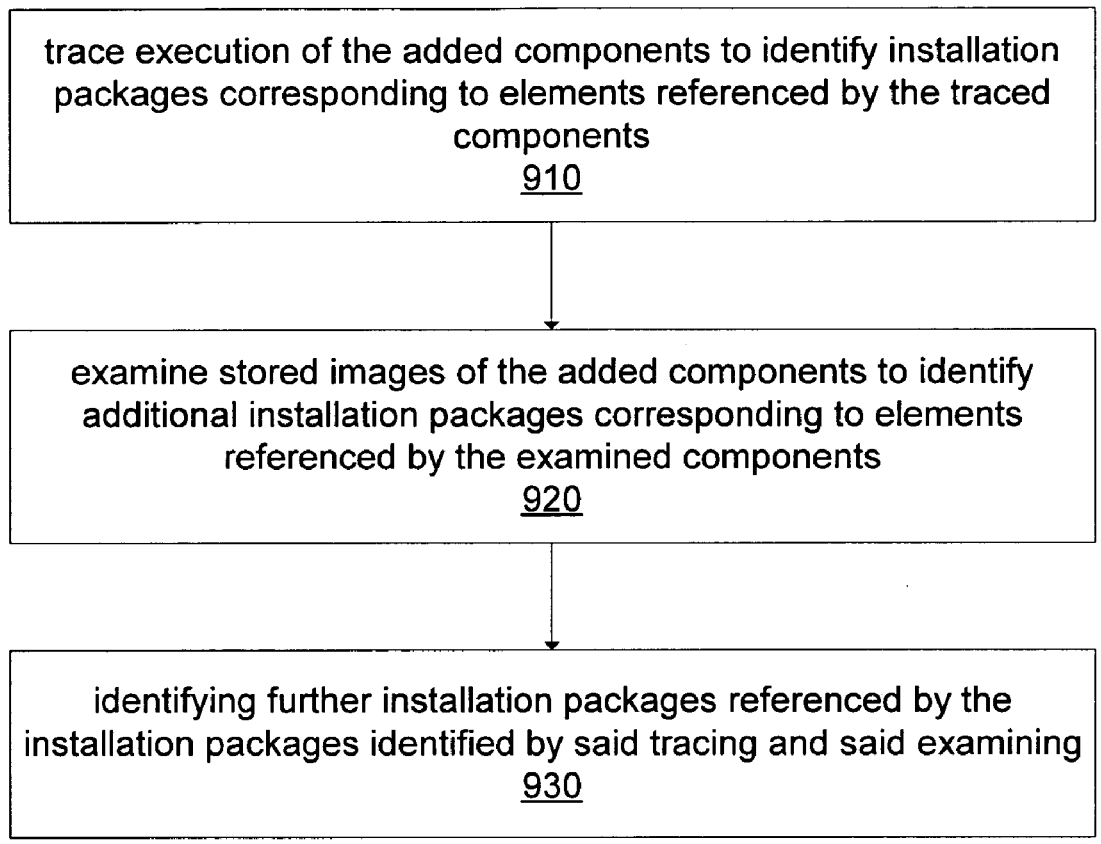
FIG. 9 is a flowchart illustrating one embodiment of a method for identifying installation packages referenced by other installation packages of an operating environment.

FIG. 9 is a flowchart illustrating a method, according to one embodiment, for identifying additional installation packages referenced by installation packages already identified as being required by the installed applications. In some embodiments, the method illustrated by FIG. 9 may be used in conjunction with the methods illustrated by FIGS. 7, and 8, as part of an overall process of identifying required installation packages for inclusion in a minimal operating environment as shown by block 440 in FIG. 4, described above. As shown in block 910 and described above, minimization tool 120 may be configured to trace the execution of components added to the operating environment to identify one or more installation packages corresponding to elements referenced by those components. Additionally, as shown in block 920, minimization tool 120 may be configured to examine stored component images to identify additional installation packages corresponding to elements of the operating environment referenced by the stored components. In certain embodiments, minimization tool 120 may also be configured to identify yet more installation packages referenced by those already identified installation packages, as shown by block 930. For instance, one installation package may be dependent upon another and both may need to be installed before an application referencing the first installation package may work correctly. For example, an email program may reference an element of an installation package providing SMTP functionality. In turn, that installation package may reference an element of another installation package providing lower level network connectively. In some embodiments, minimization tool 120 may continue examining identified installation packages to determine additional referenced installation packages until one or more root packages that do not reference any other packages is identified.

Figure 10:
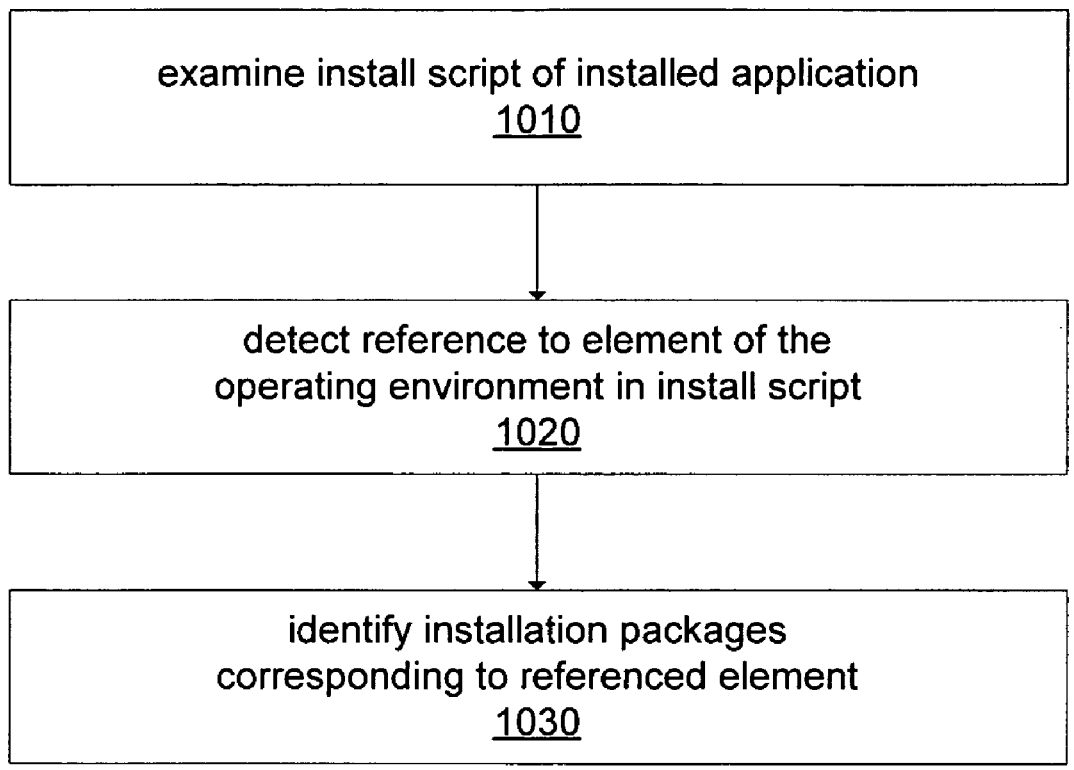
FIG. 10 is a flowchart illustrating, according to one embodiment, a method for identifying referenced installation packages of an operating environment by examining by examining install scripts of installed applications.

FIG. 10 is a flowchart illustrating one embodiment of a method for identifying installation packages corresponding to operating environment elements referenced by installation scripts or programs. When analyzing system changes and identifying installation packages as illustrated by block 440 in FIG. 4, a minimization tool, such as minimization tool 120, may, as illustrated in block 1010, examine install scripts used to install applications. When examining such an install script, minimization tool 120 may be configured to detect references to elements of the operating environment in the install script, as shown in block 1020. An install script may use one or more elements of the operating environment while installing an application. For example, an install script may use the Unix showrev utility to determine what version of a required package is currently installed on the system. In such an example, minimization tool 120 may use a program, such as grep to detect the use of showrev in an install script. Additionally, as shown in block 1030, minimization tool 120 may, in some embodiments, be configured to identify one or more installation packages corresponding to the operating environment elements referenced in the install scripts.

Please note that the flowcharts illustrated in FIGS. 4-10 are intended to illustrate just a few example embodiments and that other embodiments may perform these same actions in different manners or orders, either sequential or parallel, or may intersperse additional actions as well. Additionally, minimization tool 120 may perform the actions and functions illustrated by FIGS. 4-10, single or in combination, according to various embodiments. In yet other embodiments, minimization tool 120 may perform some of the actions or functions illustrated by FIGS. 4-10, and may additional provide a user interface for a user to perform some of these actions or functions manually.

Figure 11:
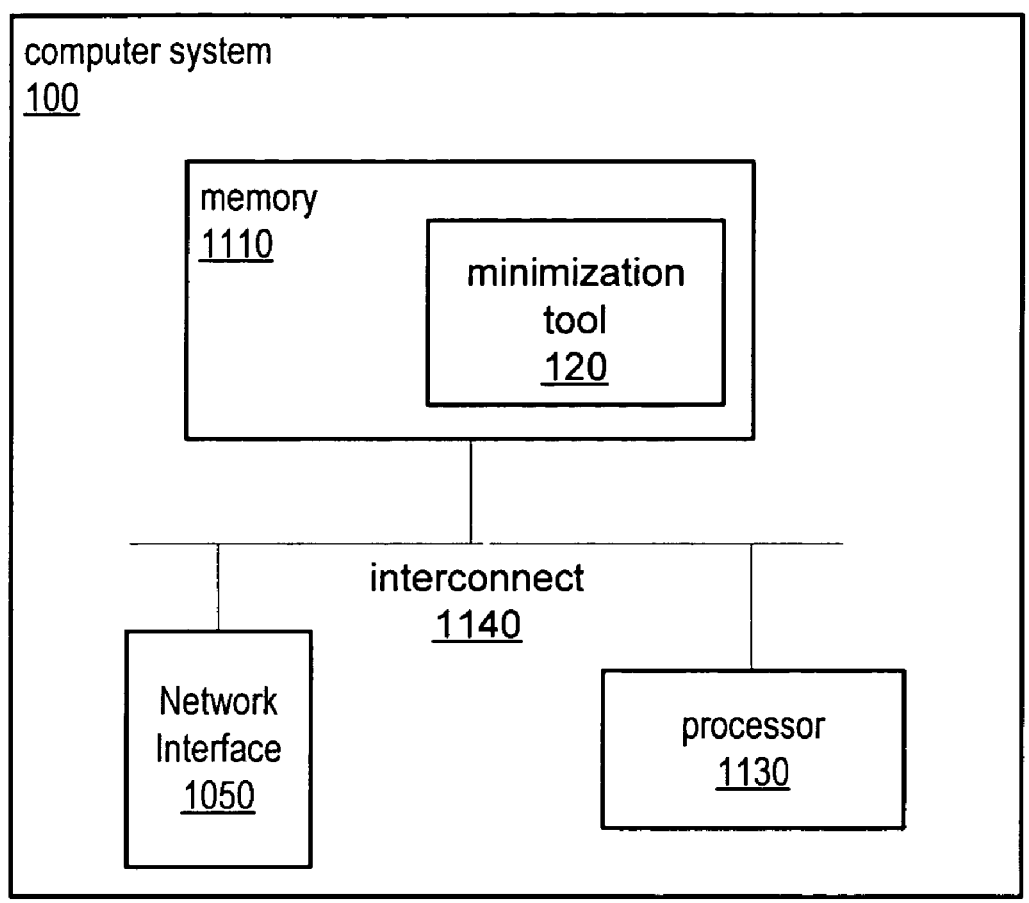
FIG. 11 is a block diagram of a computer system suitable for implementing the development of a minimized install profile as described herein.

FIG. 11 illustrates a computing system suitable for use in developing a minimized install profile as described herein and according to various embodiments. Computer system 1100 may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device with a digital heartbeat. Computer system 1100 may include at least one processor 1130. Processor 1130 may couple across interconnect 1140 to memory 1110. In some embodiments processor 1130 may also couple across interconnect 1140 to one or more network interfaces, such as Network Interface 1050. Network Interface 1050 may be any of various types of interfaces configured to couple with and communicate over Network 150, illustrated in FIG. 1B and described above.

Memory 1110 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. In some embodiments, memory 1110 may include program instructions configured to generate a minimized install profile as described herein. In certain embodiments, memory 1110 may include program instructions configured to implement a minimization tool, such as minimization tool 120. Minimization tool 120 may include program instructions configured to generate a minimized install profile as described herein.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method for generating a minimized installation profile for installing a minimized operating environment, comprising:
   installing a non-minimized operating environment comprising a plurality of installation packages on a computer system;
   installing one or more applications on the computer system in addition to the installed non-minimized operating environment;
   determining one or more system changes from said installing one or more applications to identify one or more components added to the computer system by said installing one or more applications;
   identifying one or more of the installation packages required by the installed one or more applications corresponding to one or more elements of the installed non-minimized operating environment referenced by the added one or more components;
   identifying one or more of the installation packages not required by the installed one or more applications corresponding to one or more elements of the installed non-minimized operating environment not referenced by the added one or more components; and
   creating the minimized installation profile for installing the minimized operating environment based upon a minimum profile template and including the one or more installation packages required by the installed one or more applications, wherein the minimized installation profile does not include the one or more of the installation packages of the non-minimized operating environment not required by the installed one or more applications.

2. The method of claim 1, further comprising:
   installing the minimized operating environment according to the minimized installation profile;
   identifying one or more additionally required installation packages based upon one or more installation errors detected during said installing the minimized operating environment; and
   updating the minimized installation profile according to the one or more additionally required installation packages.

3. The method of claim 2, further comprising repeating said installing the minimized operating environment, said identifying one or more additionally required installation packages, and said updating until no installation errors are detected during said installing the minimized operating environment.

4. The method of claim 1, wherein said identifying one or more of the installation packages required by the installed one or more applications comprises tracing execution of one or more of the one or more added components to identify one or more of the installation packages that correspond to one or more elements referenced by the one or more traced components.

5. The method of claim 1, wherein said identifying one or more of the installation packages required by the installed one or more applications comprises examining one or more stored images of one or more of the one or more added components to identify one or more of the installation packages that correspond to one or more elements referenced by the one or more examined components.

6. The method of claim 1, wherein said identifying one or more of the installation packages required by the installed one or more applications comprises:
   tracing execution of one or more of the one or more added components to identify one or more of the installation packages that correspond to one or more elements referenced by the one or more traced components;
   examining one or more stored images of one or more of the one or more added components to identify one or more of the installation packages that correspond to one or more elements referenced by the one or more examined components; and
   identifying one or more further installation packages referenced by the one or more installation packages identified by said tracing and said examining.

7. The method of claim 1, wherein said identifying one or more of the installation packages required by the installed one or more applications comprises analyzing one or more install scripts for the one or more installed applications to identify one or more of the installation packages that correspond to one or more elements referenced by the one or more install scripts, and wherein said creating comprises including the one or more additional installation packages in the minimized installation profile.

8. The method of claim 1, wherein said determining one or more system changes comprises comparing the installed contents of the non-minimized operating environment before and after said installing one or more applications.

9. The method of claim 1, wherein the minimum profile template includes one or more serviceability packages.

10. A device for generating a minimized installation profile for installing a minimized operating environment, comprising:

a processor; and a memory comprising program instructions configured to:
- install a non-minimized operating environment comprising a plurality of installation packages on a computer system;
- install one or more applications on the computer system in addition to the installed non-minimized operating environment;
- determine one or more system changes from said installing one or more applications to identify one or more components added to the computer system by said installing one or more applications;
- identify one or more of the installation packages required by the installed one or more applications corresponding to one or more elements of the installed non-minimized operating environment referenced by the added one or more components;
- identify one or more of the installation packages not required by the installed one or more applications corresponding to one or more elements of the installed non-minimized operating environment not referenced by the added one or more components; and
- create the minimized installation profile for installing the minimized operating environment based upon a minimum profile template and including the one or more installation packages required by the installed one or more applications, wherein the minimized installation profile does not include the one or more of the installation packages of the non-minimized operating environment not required by the installed one or more applications.

11. The device of claim 10, wherein the program instructions are further configured to:
- install the minimized operating environment according to the minimized installation profile;
- identify one or more additionally required installation packages based upon one or more installation errors detected during said installing the minimized operating environment; and
- update the minimized installation profile according to the one or more additionally required installation packages.

12. The device of claim 11, wherein the program instructions are further configured to repeat said installing the minimized operating environment, said identifying one or more additionally required installation packages, and said updating until no installation errors are detected during said installing the minimized operating environment.

13. The device of claim 10, wherein during said identifying one or more of the installation packages required by the installed one or more applications the program instructions are further configured to trace execution of one or more of the one or more added components to identify one or more of the installation packages that correspond to one or more elements referenced by the one or more traced components.

14. The device of claim 10, wherein during said identifying one or more of the installation packages required by the installed one or more applications the program instructions are further configured to examine one or more stored images of one or more of the one or more added components to identify one or more of the installation packages that correspond to one or more elements referenced by the one or more examined components.

15. The device of claim 10, wherein during said identifying one or more of the installation packages required by the installed one or more applications the program instructions are further configured to:
- trace execution of one or more of the one or more added components to identify one or more of the installation packages that correspond to one or more elements referenced by the one or more traced components;
- examine one or more stored images of one or more of the one or more added components to identify one or more of the installation packages that correspond to one or more elements referenced by the one or more examined components; and
- identify one or more further installation packages referenced by the one or more installation packages identified by said tracing and said examining.

16. The device of claim 10, wherein during said identifying one or more of the installation packages required by the installed one or more applications the program instructions are further configured to analyze one or more install scripts for the one or more installed applications to identify one or more of the installation packages that correspond to one or more elements referenced by the install scripts, and wherein during said creating the program instructions are further configured to include the one or more additional installation packages in the minimized installation profile.

17. The device of claim 10, wherein during said determining one or more system changes the program instructions are further configured to compare the installed contents of the non-minimized operating environment before and after said installing one or more applications.

18. The device of claim 10, wherein the minimum profile template includes one or more serviceability packages.

19. A computer accessible medium for generating a minimized installation profile for installing a minimized operating environment, comprising program instructions configured to implement:
- installing a non-minimized operating environment comprising a plurality of installation packages on a computer system;
- installing one or more applications on the computer system in addition to the installed non-minimized operating environment;
- determining one or more system changes from said installing one or more applications to identify one or more components added to the computer system by said installing one or more applications;
- identifying one or more of the installation packages required by the installed one or more applications corresponding to elements of the installed non-minimized operating environment referenced by the added one or more components;
- identifying one or more of the installation packages not required by the installed one or more applications corresponding to one or more elements of the installed non-minimized operating environment not referenced by the added one or more components; and
- creating the minimized installation profile for installing the minimized operating environment based upon a minimum profile template and including the one or more installation packages required by the installed one or more applications, wherein the minimized installation profile does not include the one or more of the installation packages of the non-minimized operating environment not required by the installed one or more applications.

20. The computer accessible medium of claim 19, wherein the program instructions are further configured to implement:
- installing the minimized operating environment according to the minimized installation profile;

identifying one or more additionally required installation packages based upon one or more installation errors detected during said installing the minimized operating environment; and updating the minimized installation profile according to the one or more additionally required installation packages.

21. The computer accessible medium of claim 20, wherein the program instructions are further configured to implement repeating said installing the minimized operating environment, said identifying one or more additionally required installation packages, and said updating until no installation errors are detected during said installing the minimized operating environment.

22. The computer accessible medium of claim 19, wherein during said identifying one or more of the installation packages required by the installed one or more applications the program instructions are further configured to implement tracing execution of one or more of the one or more added components to identify one or more of the installation packages that correspond to one or more elements referenced by the traced components.

23. The computer accessible medium of claim 19, wherein during said identifying one or more of the installation packages required by the installed one or more applications the program instructions are further configured to implement examining one or more stored images of one or more of the one or more added components to identify one or more of the installation packages that correspond to one or more elements referenced by the one or more examined components.

24. The computer accessible medium of claim 19, wherein during said identifying one or more of the installation packages required by the installed one or more applications the program instructions are further configured to implement:

tracing execution of one or more of the one or more added components to identify one or more of the installation packages that correspond to one or more elements referenced by the one or more traced components;

examining one or more stored images of one or more of the one or more added components to identify one or more of the installation packages that correspond to one or more elements referenced by the one or more examined components; and identifying one or more further installation packages referenced by the one or more installation packages identified by said tracing and said examining.

25. The computer accessible medium of claim 19, wherein during said identifying one or more of the installation packages required by the installed one or more applications the program instructions are further configured to implement analyzing one or more install scripts for the one or more installed applications to identify one or more of the installation packages that correspond to one or more elements referenced by the one or more install scripts, and wherein during said creating the program instructions are further configured to implement including the one or more additional installation packages in the minimized installation profile.

26. The computer accessible medium of claim 19, wherein during said determining one or more system changes the program instructions are configured to implement comparing the installed contents of the non-minimized operating environment before and after said installing one or more applications.

27. The computer accessible medium of claim 19, wherein the minimum profile template includes one or more serviceability packages.

* * * * *